Aug. 11, 1964

J. E. RAMSEY, JR 3,144,602

INDUCTION-TYPE DEVICE PROTECTED AGAINST
EXTERNAL FIELD INFLUENCE

Filed April 18, 1961

WITNESSES:
Bernard R. Giguay
James F. Young

INVENTOR
James E. Ramsey, Jr.

BY C.L. Friedman
ATTORNEY

Aug. 11, 1964    J. E. RAMSEY, JR    3,144,602
INDUCTION-TYPE DEVICE PROTECTED AGAINST
EXTERNAL FIELD INFLUENCE
Filed April 18, 1961    2 Sheets-Sheet 2

United States Patent Office 3,144,602
Patented Aug. 11, 1964

3,144,602
INDUCTION-TYPE DEVICE PROTECTED AGAINST EXTERNAL FIELD INFLUENCE
James E. Ramsey, Jr., Raleigh, N.C., assignor to Westinghouse Electric Corporation, East Pittsburgh, Pa., a corporation of Pennsylvania
Filed Apr. 18, 1961, Ser. No. 103,912
6 Claims. (Cl. 324—137)

This invention relates to induction devices and it has particular relation to induction devices which are responsive to a function of volt amperes.

Induction devices are widely employed for measuring various functions of volt amperes. For example, such a device may measure the real component of volt-ampere hours or watthours and the reactive component of volt-ampere hours or var hours. Such induction devices have been employed extensively for measuring both single-phase and polyphase quantities. Although the invention can be applied to any of the foregoing applications of induction devices it will be described as applied to a watthour meter.

In the design of a modern watthour meter it is important that stray magnetic field influence be minimized. This is particularly true for light-load operating conditions. In some cases it has been found most difficult to maintain stray magnetic field influence below acceptable limits.

Stray magnetic fields are produced by currents flowing through conduits and sockets, and through conductors located in such conduits and sockets. Early attempts to minimize the influence on the watthour meter of such stray magnetic fields were by locating magnetic shields between the source of the stray magnetic field and the electromagnet of the watthour meter. Such shields were not particularly effective and in some cases it was found impossible by such means to develop suitable shields which would bring stray magnetic field influence within the acceptable limits.

In accordance with the invention a stray-field minimizer is located substantially on that side of the watthour meter electromagnet which is opposite to the side on which the source of the stray magnetic field is located. In a preferred embodiment of the invention a stray-field minimizer takes the form of a U-shaped soft magnetic member which substantially surrounds the current poles of the watthour meter electromagnet.

It is therefore an object of the invention to provide an induction device of improved design wherein stray field influence is minimized.

It is a further object of the invention to provide an induction device for measuring a function of volt amperes with a stray-field minimizer which is located on that side of the device which is opposite to the side on which the source of stray field is normally located.

It is also an object of the invention to provide an induction device having an electromagnet provided with a pair of current poles located substantially within a soft magnetic U-shaped stray-field minimizer.

Other objects of the invention will be apparent from the following description taken in conjunction with the accompanying drawings, in which.

Figure 1:
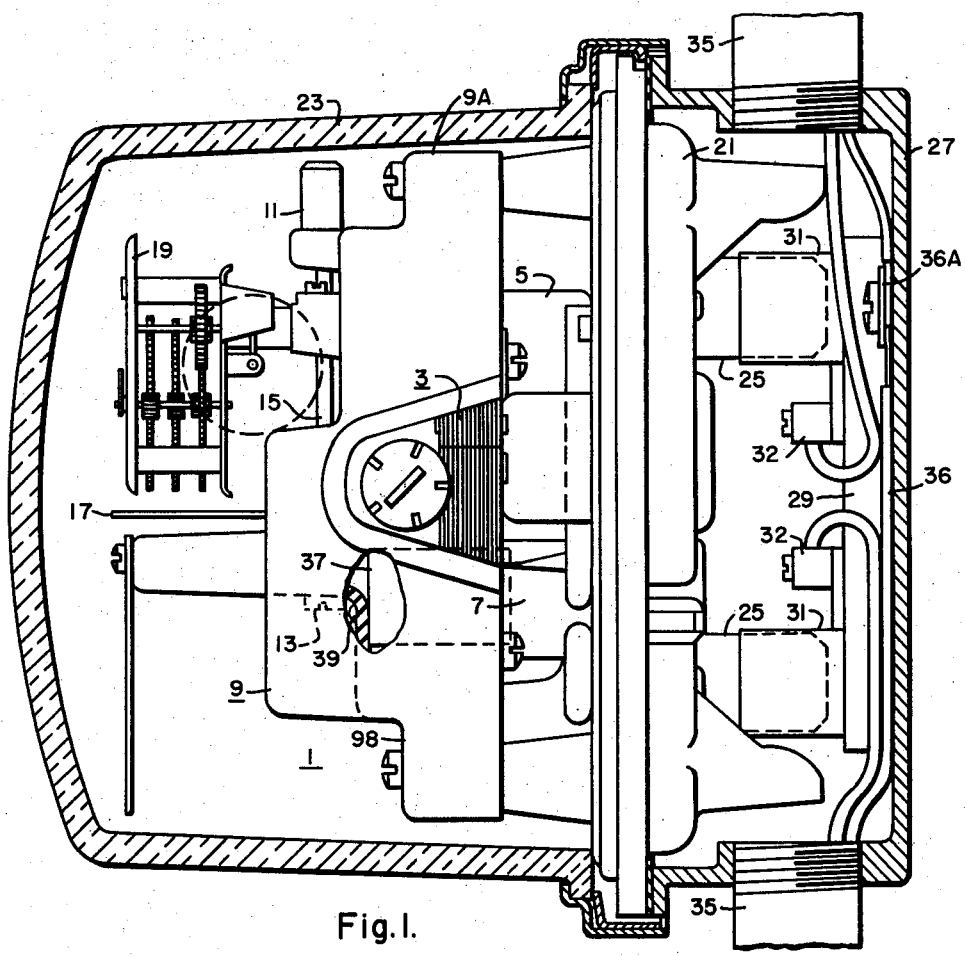
FIGURE 1 is a view in side elevation with parts broken away of an induction-type watthour meter embodying the invention.

Referring to FIG. 1 a watthour meter 1 is illustrated which includes an electromagnet 3. The electromagnet has voltage winding means 5 and current winding means 7 which when energized product a shifting magnetic field.

The electromagnet 3 is mounted in a frame 9 which is constructed of a non-magnetic electroc-conductive material such as an aluminum die-casting alloy. This frame provides a rim portion 9A which substantially surrounds the periphery of the electromagnet 3. In addition, the frame has a front portion 9B which extends substantially over the front of the electromagnet 3.

Other components of the watthour meter are supported by the frame 9. Thus, the frame has bearing units 11 and 13 which rotatably receive a shaft 15 to mount the shaft for rotation relative to the electromagnet 3. This shaft supports an electro-conductive disc or armature 17 which has a portion located in the shifting magnetic field provided by the electromagnet 3. Conventional damping magnets (not shown) are secured to the frame 9 to provide a magnetic field through which a portion of the armature 17 rotates. As well understood in the art, when the electromagnet 3 is suitably energized the armature 17 rotates at a rate dependent on the electrical energy supplied by an electrical circuit from which the electromagnet 3 is energized. The rotation of the shaft 15 is counted or registered by means of a conventional register 19.

The watthour meter 1 is mounted on a suitable base 21 which conveniently may be constructed of an insulating material such as a phenolic resin. The watthour meter 1 is located within a casing formed by the base 21 and a cup-shaped glass cover 23 which is detachably secured to the base 21 in any conventional manner.

In order to couple the electromagnet windings to an external electrical circuit terminal means are provided which pass through the base 21. In the embodiment of FIG. 1, the terminal means take the form of contact blades 25 which have portions extending into the casing for connection to the winding means and portions accessible externally of the casing.

Connections to the contact blades 25 from an external circuit are established by a conventional socket which includes a cup-shaped enclosure 27 having its open end closed by the base 21. The enclosure 27 carries insulating blocks 29 on which contact jaws 31 are mounted. These contact jaws are positioned to receive detachably the contact blades 25 when the watthour meter 1 and its casing are moved to the right as viewed in FIG. 1 into the mounted position therein illustrated.

Each of the contact jaws 31 has a suitable terminal 32 connected thereto for receiving the conductor of an external circuit with which the watthour meter is to be associated. The conductors enter and leave the sockets through conduit 35 as shown in FIG. 1.

It is common practice to employ a ground conductor 36 which is attached to a ground terminal 36A in the socket. In a 3-wire system the ground conductor is not connected to the meter. It may be located about 1½ inches from the rear of the meter base. Current flowing through the ground conductor can subject the meter to substantial magnetic field influence, particularly if it carries high currents desired from other associated circuits.

The structure of FIG. 1 as thus far described is conventional in the art and is described in greater detail in a publication entitled "Descriptive Bulletin 42–101," dated May 1960, and published by the Westinghouse Electric Corporation, Raleigh Plant, Raleigh, North Carolina.

As previously noted, due to current flowing through the conduit 35 and the associated socket or through conductors located in such conduit and socket the watthour meter may be subjected to substantial stray magnetic fields. Similar fields can be produced by currents flowing through conductors of other meter installations located near the meter 1. Such multiple meter installations occur in various locations, for example in business establishments, factories and apartment houses. These fields may affect the accuracy of the watthour meter particularly under light-load conditions. In some cases it has been found difficult to minimize such stray field influence sufficiently to permit the watthour meter to fall within the accuracy limits imposed by existing regulations.

Attempts have been made to bring watthour meters having excessive stray field influence within acceptable limits by interposing a magnetic shield between portions of the electromagnet 3 and the associated socket without acceptable results.

In accordance with the invention stray-field influence has been satisfactorily reduced by mounting a stray-field minimizer 37 substantially on that side of the electromagnet 3 which is opposite to the side on which the socket is located. Conveniently, the stray-field minimizer may be secured to the frame 9 in any suitable manner as by means of a rivet 39. The stray-field minimizer 37 is constructed of a soft magnetic material such as silicon iron.

Figure 2:
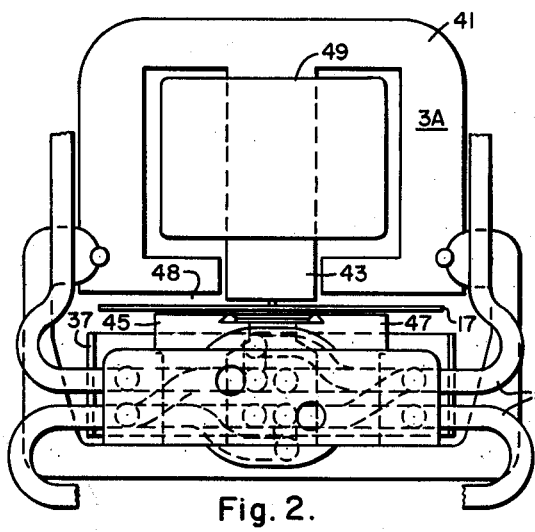
FIG. 2 is a view in rear elevation of a watthour meter electromagnet suitable for the embodiment of FIG. 1 and associated with a stray field minimizer embodying the invention.
Figure 4:
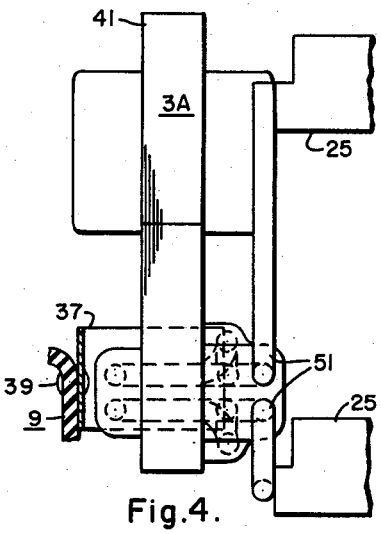
FIG. 4 is a view in side elevation of the structure shown in FIG. 2.

In FIG. 2 an electromagnetic 3A is illustrated which may be employed as the electromagnetic 3 of FIG. 1. The electromagnetic 3A includes a magnetic structure 41 which may be constructed of laminations of soft magnetic material such as silicon iron. The magnetic structure includes a voltage pole 43 and two current poles 45 and 47 which are spaced to provide an air gap 48 in which the armature 17 is positioned. The voltage pole 43 is surrounded by a voltage winding 49. In accordance with standard practice the voltage winding 49 has a large number of turns of small diameter wire and is designed to be energized in accordance with the voltage between conductors of an associated electrical circuit. Each of the current poles is surrounded by one or more windings 51 of large diameter wire which is intended to be energized in accordance with currents flowing in conductors of an associated electrical circuit. The polarities of the current windings are such that when magnetic flux is directed by the windings downwardly in one of the current poles magnetic flux is directed upwardly by the current windings in the other of the current poles.

As well understood in the art when the windings 49 and 51 are suitably energized a shifting magnetic field is produced in the air gap which produces rotation of the armature 17. The magnetic structure 41 is of planar construction, the poles 43, 45 and 47 all being located substantially in a common plane.

Figure 3:
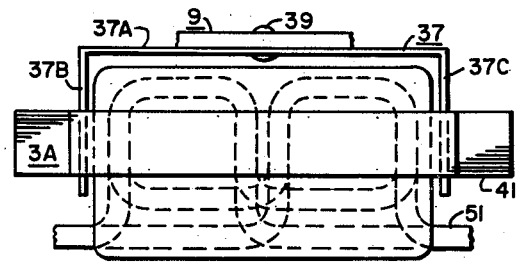
FIG. 3 is a view in top plan of the structure shown in FIG. 2.

As shown more clearly in FIG. 3 the stray-field minimizer includes a central part 37A which is located in front of the electromagnetic 3A and which extends substantially parallel to the magnetic structure 41. The ends of the central part 37A have legs 37B and 37C extending through openings in the electromagnet 3A to position the current poles 45 and 47 substantially between such legs. I have found that the central part 37A alone suffices to reduce stray field influence very substantially. However, the addition of the legs 37B and 37C is desirable for applications wherein even further reduction in stray-field influence is desired.

It will be noted that the stray-field minimizer 37 is spaced substantially from parts of the electromagnet which operate at different magnetomotive potentials. Consequently, the stray-field minimizer has little effect on the working magnetic flux and does not appreciably reduce the efficiency of the watthour meter. The stray-field minimizer is positioned in the path of the external interference magnetic flux and guides it away from the armature driving field in the air gap 48.

The electromagnet of FIG. 2 may be employed in a single-phase watthour meter or it may be one element of a plural-element polyphase watthour meter. The invention has been found particularly suitable for a polyphase single-electromagnet watthour meter known as a network meter which is available on the market. This network meter is represented in FIG. 5.

Figure 5:
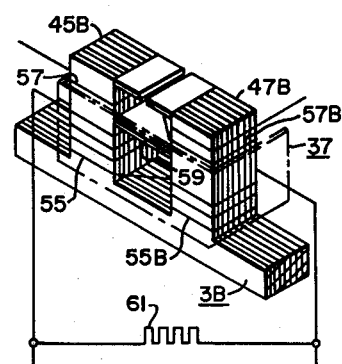
FIG. 5 is a view in perspective with parts broken away and parts shown diagrammatically of a modified electromagnet which may be employed in the embodiment of FIG. 1.

Referring to FIG. 5, an electromagnet 3B is provided which may be employed as the electromagnet 3 of FIG. 1. The electromagnet 3B is similar to the electromagnet 3A of FIG. 2 except for the construction of the current poles and the current windings associated therewith. For this reason the discussion of FIG. 5 will be directed primarily to the current poles and the windings thereon.

The electromagnet 3B of FIG. 5 has two current poles 45B and 47B which correspond respectively to the current poles 45 and 47 of FIG. 2. The current pole 45B has two current windings 55 and 57 spaced therealong. In an analogous manner the current pole 47B has two current windings 55B and 57B spaced therealong. The windings 57 and 57B are connected in series and are so positioned and energized that when magnetic flux is directed upwardly in one of the poles it is directed downwardly in the other of the poles by the windings. In a similar manner the windings 55 and 55B are connected in series and direct magnetic flux in opposite directions through their associated poles. In order to increase the inductance of the windings 55 and 55B a magnetic bridge 59 extends between the current poles 45B and 47B at a position located between the two sets of series-connected current windings. This materially increases the inductance of the windings 55 and 55B.

For phase adjustment purposes a resistor 61 is connected across the series-connected windings 55 and 55B. In this way the magnetic flux produced by the series-connected windings 55 and 55B is adjusted in phase relative to the current supplied to such windings and the resistor 61 in parallel.

Meters of this type are available on the market, one of the available meters being sold under the trade designation DSN Single Stator Network Watthour Meter by the Westinghouse Electric Corporation which has a plant at Raleigh, North Carolina, and described in leaflet I.L. 42–101.7 dated March 1960 and printed by the same corporation. As conventionally employed each of the sets of series-connected current windings is energized by a different phase current of a polyphase system. Each of the sets of windings produces magnetic flux of correct phase to co-act properly with the voltage magnetic flux. The stray-field minimizer 37 reduces stray field influence to a satisfactorily low value.

Although the invention has been described with reference to certain specific embodiments thereof, various modifications falling within the spirit and scope of the invention are possible.

I claim as my invention:

1. In an induction device responsive to an alternating quantity, a base structure having a first side and a second side, an electromagnet located on the first side of the base structure, said device having a current path on the second side of said base structure for electric current producing stray magnetic influence, said electromagnet comprising a magnetic structure having an air gap, multiturn voltage winding means adapted to be energized in accordance with the voltage of an alternating circuit, and current winding means adapted to be energized in accordance with current flowing in an alternating circuit, said winding means when energized from an alternating current circuit cooperating with the magnetic structure to produce a shifting magnetic field in the air gap, terminal means coupled to the winding means and extending on the second side of the base structure for connecting the winding means to an electrical circuit, an electro-conductive armature having a part in said air gap, means mounting the armature for movement relative to the magnetic structure under the influence of said shifting magnetic field, an electro-conductive non-magnetic member having a portion adjacent and substantially extending over the electromagnet, said electromagnet being located between said portion and the base structure, and a soft magnetic member located between said portion and the electromagnet adjacent the air gap for protecting the electromagnet from stray field influence due to current flowing in paths on said second side of the base structure, said magnetic member being spaced from parts of said electromagnet having a substantial magnetomotive force thereacross sufficiently to prevent the flow of appreciable magnetic flux through the magnetic member under the influence of said force, said soft magnetic member extending between the non-magnetic member and the electromagnet over an area and with a cross-section proportioned to provide substantial protection for the electromagnet against stray magnetic field influence from fields produced by electric current flowing in said current path.

2. In an induction device responsive to an alternating quantity, a base structure having a first side and a second side, an electromagnet located on the first side of the base structure, said device having a current path on the second side of said base structure for electric current producing stray magnetic influence, said electromagnet comprising a planar magnetic structure having a voltage pole and a pair of current poles spaced to define an air gap, multiturn voltage winding means on said voltage pole adapted to be energized in accordance with the voltage of an alternating circuit, and current winding means on said current poles adapted to be energized in accordance with current flowing in an alternating circuit, said winding means when energized from an alternating current circuit cooperating with the magnetic structure to produce a shifting magnetic field in the air gap, terminal means coupled to the winding means and extending on the second side of the base structure for connecting the winding means to an electrical circuit, an electro-conductive armature having a part in said air gap, means mounting the armature for movement relative to the magnetic structure under the influence of said shifting magnetic field, an electro-conductive non-magnetic member having a portion adjacent and substantially extending over the electromagnet, said electromagnet being located between said portion and the base structure, and a U-shaped soft magnetic member having a central part between said portion and the electromagnet and having separate legs projecting respectively in the direction of separate spaced lines from opposite ends of said central part towards said base, said current poles being spaced in the direction of spacing of said lines and being located substantially between said lines, and said magnetic member being spaced from parts of said electromagnet having a substantial magnetomotive force thereacross sufficiently to prevent the flow of appreciable magnetic flux through the magnetic member under the influence of said force, said magnetic member having a low magnetic reluctance to stray magnetic fields produced by current flowing in said current path and having a cross-section proportioned to assure substantial diversion of magnetic flux produced by such stray magnetic fields away from said air gap.

3. In an induction device responsive to an alternating quantity, a base structure having a first side and a second side, an electromagnet located on the first side of the base structure, said device having a current path on the second side of said base structure for electric current producing stray magnetic influence, said electromagnet comprising a planar magnetic structure having a voltage pole and a pair of current poles spaced to define an air gap, multiturn voltage winding means on said voltage pole adapted to be energized in accordance with the voltage of an alternating circuit, and current winding means comprising a pair of current windings spaced along said current poles, each of the current windings being adapted to be energized in accordance with current flowing in an alternating circuit, a magnetic element extending between said current poles intermediate said current windings to establish a high inductance for one of said current windings, a resistor connected across the last-named current winding to establish a predetermined phase relation between magnetic flux produced by the last-named current winding and current flowing through the parallel combination of the last-named current winding and the resistor in parallel, said winding means when energized from an alternating current circuit cooperating with the magnetic structure to produce a shifting magnetic field in the air gap, terminal means coupled to the winding means and extending on the second side of the base structure for connecting the winding means to an electrical circuit, an electro-conductive armature having a part in said air gap, means mounting the armature for movement relative to the magnetic structure under the influence of said shifting magnetic field, an electro-conductive non-magnetic member having a portion adjacent and substantially extending over the electromagnet, said electromagnet being located between said portion and the base structure, and a U-shaped soft magnetic member having a central planar part adjacent said portion and having separate legs projecting respectively from opposite ends of said central part towards said base, said current poles being located substantially between said legs, and said magnetic member being spaced from parts of said electromagnet having a substantial magnetomotive force thereacross sufficiently to prevent the flow of appreciable magnetic flux through the magnetic member under the influence of said force, said magnetic member having a low magnetic reluctance to stray magnetic fields produced by current flowing in said current path and having a cross-section proportioned to assure substantial diversion of magnetic flux produced by such stray magnetic fields away from said air gap.

4. In an induction device responsive to an alternating quantity, a base structure having a first side and a second side, an electromagnet located on the first side of the base structure, said device having a current path on the second side of said base structure for electric current producing stray magnetic influence, said electromagnet comprising a magnetic structure having a voltage pole and a pair of current poles spaced to define an air gap, multiturn voltage winding means on said voltage pole adapted to be energized in accordance with the voltage of an alternating circuit, and current winding means on said current poles adapted to be energized in accordance with current flowing in an alternating circuit, said winding means when energized from an alternating current circuit cooperating with the magnetic structure to produce a shifting magnetic field in the air gap, terminal means coupled to the winding means and extending on the second side of the base structure for connecting the winding means to an electrical circuit, an electro-conductive armature having a portion in said air gap, means mounting the armature for movement relative to the magnetic structure under the influence of said shifting magnetic field, and a U-shaped soft magnetic member positioned with said current poles located substantially between the legs of the U-shaped soft magnetic member and between the magnetic member and the base structure, said magnetic member having a magnetic reluctance to stray magnetic fields under all normal conditions of energization of said winding means which is substantially less than the magnetic reluctance of air and having a cross-section proportioned to assure substantial diversion away from said air gap of stray magnetic flux produced by current flowing in said current path.

5. In an induction device responsive to an alternating quantity, a base structure, an electromagnet located on a first side of the base structure, said electromagnet comprising a soft magnetic structure including voltage pole means, current pole means spaced from the voltage pole means to define an air gap therebetween, multiturn voltage winding means on said voltage pole means adapted to be energized in accordance with the voltage of an alternating circuit, and current winding means on said current pole means adapted to be energized in accordance with current flowing in an alternating circuit, said winding means when energized from an alternating current circuit cooperating with the magnetic structure to produce a shifting magnetic field in the air gap, electroconductive terminal means coupled to the winding means and extending through the base structure from said first side to a second side of the base structure and accessible on said second side for connecting the winding means to an electrical circuit, an electroconductive armature having a portion in said air gap between the voltage pole means and the current pole means, means mounting the armature for rotation about an axis relative to the electromagnet under the influence of said shifting magnetic field, and a soft magnetic member located substantially entirely on the current pole means side of the armature, said current pole means being located substantially between the soft magnetic member and the base structure, said soft magnetic member being spaced from parts of said electromagnet having a substantial magnetomotive force thereacross sufficiently to prevent saturation of the soft magnetic member under the influence of said force, said soft magnetic structure having a magnetic reluctance to stray magnetic fields which is substantially less than the magnetic reluctance of air, and being proportioned to substantially divert away from said air gap external interference magnetic flux produced by current flowing on the second side of said base structure.

6. In an induction device responsive to an alternating quantity, a base structure, an electromagnet located on a first side of the base structure, said electromagnet comprising a soft magnetic structure including voltage pole means, current pole means spaced from the voltage pole means to define an air gap therebetween, multiturn voltage winding means on said voltage pole means adapted to be energized in accordance with the voltage of an alternating circuit, and current winding means on said current pole means adapted to be energized in accordance with current flowing in an alternating circuit, said winding means when energized from an alternating current circuit cooperating with the magnetic structure to produce a shifting magnetic field in the air gap, electroconductive terminal means coupled to the winding means and extending through the base structure from said first side to a second side of the base structure and accessible on said second side for connecting the winding means to an electrical circuit, an electroconductive armature having a portion in said air gap between the voltage pole means and the current pole means, means mounting the armature for rotation about an axis relative to the electromagnet under the influence of said shifting magnetic field, and a soft magnetic member having a central part located substantially entirely on the current pole means side of the armature, said current pole means being located substantially between the soft magnetic member and the base structure, said soft magnetic member being spaced from parts of said electromagnet having a substantial magnetomotive force thereacross sufficiently to prevent saturation of the soft magnetic member under the influence of said force, said soft magnetic structure having a magnetic reluctance to stray magnetic fields which is substantially less than the magnetic reluctance of air, said soft magnetic structure comprising a pair of legs respectively projecting from the ends of the central part towards the base structure to locate the current pole means between the legs and having a cross-section proportioned to assure substantial diversion away from said air gap of stray magnetic flux produced by current flowing on the second side of said base structure.

References Cited in the file of this patent
UNITED STATES PATENTS

| | | |
|---|---|---|
| 693,537 | Batault | Feb. 18, 1902 |
| 2,507,320 | Riordan | May 9, 1950 |
| 2,970,265 | Lipscomb | Jan. 31, 1961 |